United States Patent Office.

JOHN F. BOYNTON, OF SYRACUSE, NEW YORK.

Letters Patent No. 61,390, dated January 22, 1867.

---

IMPROVED COMPOUND FOR TELEGRAPH INSULATORS, AND FOR OTHER PURPOSES.

---

The Schedule referred to in these Letters Patent and making part of the same.

---

TO ALL WHOM IT MAY CONCERN:

Be it known that I, JOHN F. BOYNTON, of the city of Syracuse, county of Onondaga, in the State of New York, have invented a new and improved Compound for Telegraph Insulators, and for other purposes; and I do hereby declare that the following is a full and exact description thereof.

The nature of my invention and improvement consists in the combination of hydrocarbons with sulphur, sulphurets, silicious and calcareous substances, for the purpose of producing non-conductors of electricity, and preventing their absorption of water; likewise producing a rapid evaporation of moisture that may come in contact with their surfaces, so that when telegraph caps, pins, brackets, or hooks are made of a combination of these materials the most perfect insulation may be obtained.

To enable others skilled in the art to make and use my invention, I will proceed to describe its composition and operation.

I make my caps, pins, or brackets of silicate of alumina, silicic acid, or other substances that become hardened by the process of burning or cementation. They may be moulded, turned, or pressed into form by a die, and hardened by burning or cementation; and, when raised to a temperature of from four to five hundred degrees, the air and moisture will be expelled from their interstices or pores, when they may be plunged into highly heated hydrocarbons or hydrocarbons, mingled with sulphur, and there left to cool, when the weight of the column of liquid above, and the pressure of the atmosphere, will cause the sulphur and hydrocarbons to permeate the minutest cavity which before was occupied by vapor and air; and thus a resinous material will be diffused throughout a vitreous, thereby mingling substances well known to exhibit positive and negative electric conditions. All of the above-named materials are poor conductors of electricity; and, as the pores of the vitreous material have been filled with one that is resinous and destitute of oxygen, no water can penetrate or decomposition take place; and, as the material is black or dark colored, it readily absorbs heat, and quickly evaporates any moisture which may be deposited upon its surface, thereby combining several principles in the construction and composition of an electric insulator which heretofore have not been obtained.

In this specification I have particularly described my invention as applicable to telegraph insulators; but it is also applicable to all kinds of earthenware pottery, such as tiles, bricks, building blocks, and drain pipe; and that part of it which relates to saturating with hydrocarbons is applicable to porous stone, wood, cast iron, and other porous substances, for preserving them. Paraffine, tallow, or any other hydrocarbons may be used in carrying this invention into effect, but I prefer to use the natural asphaltums or the asphalts of gas tar and petroleum, thinned, when necessary, with the products distilled from them.

In the above application I do not wish or desire to be confined to the exact temperature or quantity of materials which are to be used for the purposes above specified; but what I claim as my invention, and desire to secure by Letters Patent, is—

1. I claim as a composition for an electric insulator a combination of hydrocarbons with silicic acid and silicate of alumina.

2. I claim the combination of sulphur with the silicate of alumina and silicic acid for the purpose set forth.

3. I claim the combination of sulphur, hydrocarbons, silicic acid, and silicate of alumina, as and for the purpose herein set forth.

4. I claim any combination of silicates with sulphur or hydrocarbons so arranged or combined that when formed into an electric insulator it will be black or dark colored, for the purpose herein specified.

5. I also claim saturating earthenware, brick, tiles, drain pipe, porous stone, wood, cast iron, and other hard, porous substances with the compounds herein described, after subjecting said substances to a sufficient degree of heat to expel the air and moisture therefrom, substantially as and for the purposes described.

JOHN F. BOYNTON.

Witnesses:
   J. J. COOMBS,
   RANDOLPH BOYNTON.